United States Patent
Applegate et al.

(10) Patent No.: US 7,624,100 B1
(45) Date of Patent: Nov. 24, 2009

(54) METHOD FOR WEB-BASED EXPLORATION OF NETWORK INFRASTRUCTURE

(75) Inventors: David Lee Applegate, Maplewood, NJ (US); Maksym Badrak, Alpharetta, GA (US); Hossein Eslambolchi, Los Altos Hills, CA (US); John R. Perkins, Edison, NJ (US); Nicholas F. Reingold, Madison, NJ (US); Vitaly Smirnoff, Alpharetta, GA (US); Harold Jeffrey Stewart, Alpharetta, GA (US)

(73) Assignee: AT&T Corp., New York, NY (US)

( * ) Notice: Subject to any disclaimer, the term of this patent is extended or adjusted under 35 U.S.C. 154(b) by 245 days.

(21) Appl. No.: 11/317,774

(22) Filed: Dec. 23, 2005

Related U.S. Application Data

(63) Continuation of application No. 10/440,892, filed on May 19, 2003, now abandoned.

(51) Int. Cl.
*G06F 17/30* (2006.01)
(52) U.S. Cl. ............................................. 707/3; 707/10
(58) Field of Classification Search .................. 707/2–5, 707/10; 709/203
See application file for complete search history.

(56) References Cited

U.S. PATENT DOCUMENTS

| | | | |
|---|---|---|---|
| 6,202,023 B1 | 3/2001 | Hancock et al. | |
| 6,377,993 B1 | 4/2002 | Brandt et al. | |
| 6,820,092 B2 | 11/2004 | Nakano et al. | |
| 6,859,783 B2* | 2/2005 | Cogger et al. | 705/10 |
| 6,954,737 B2 | 10/2005 | Kalantar et al. | |
| 6,985,874 B1 | 1/2006 | Ebihara et al. | |
| 6,993,718 B2 | 1/2006 | Fujihara | |
| 2004/0093325 A1* | 5/2004 | Banerjee et al. | 707/3 |
| 2006/0105775 A1* | 5/2006 | Von Kaenel et al. | 455/456.1 |

* cited by examiner

*Primary Examiner*—Cheryl Lewis

(57) ABSTRACT

In accordance with the teachings of the present invention, a method of data drilling is presented. A network database is deployed in a network, such as the Internet, for broad-based user access. Network information is stored in the network database and is organized in layers. A graphical user interface with data objects is presented to an end user. Selecting a data object generates a query performed by a server. Each query produces more details on an initially selected data object.

20 Claims, 12 Drawing Sheets

Data for facility: [A] R3304 OC12U
BSTNMADWH07 BSTNMACOHAX

Location data | Devices | Facilities | Circuits

| | |
|---|---|
| Serial | R3304 |
| Type | OC12U |
| Channel | |
| Circuit ID | |
| Circuit Type | |
| Start Building | ONE FINANCIAL CENTER |
| Start Device | BSTNMADWH070102007 |
| Start Device Type | ZOC-12 AT&T |
| Start Port | BSTNMADWH07010 2007E000 |
| Location 2 | BSTNMACOHAX (NP) |
| End Building | 230 CONGRESS STREET |
| End Device | BSTNMACOHAX2601003 |
| End Device Type | ZOC-12 AT&T |
| End Port | BSTNMACOHAX2601003W000 |
| Status | A |
| Customer Facility | |
| Format | N/A |
| Customer ID | TCBB01 |
| Project ID | BOST0100670 |
| Roll Project ID | |
| Bandwidth | 601320 |
| Condition | |
| Type II flag | |
| Remark | |
| Special Remark | |
| LEC ID | |
| LEC Order Number | |

Fig. 9

Data for device:

Bayrack data

| Field | Value |
|---|---|
| Location | BSTNMAOWH07 |
| Device ID | 007 |
| Device Type | ED-BC727-30G1 |
| Part Number | ED-BC727-30 |
| Part Revision | G1 |
| Project Number | BOST0100668 |
| Inventory Number | |
| Status | A |
| Remarks | R3304 - RORD #BOST0100668 |
| Install Date | 8/21/2001 12:00:00 AM |
| Purchase Date | |
| Network Address | 10.33.1.143-3342(1,3) |
| Power Source | |
| Backup Power Source | |
| Equipment Cost | 17095.7 |
| Labor Cost | 490 |
| Cost | 3021.2 |
| Craft Interface | 10.33.1.144-8015 F/E |
| Ownership | T |
| Kit | N |
| Software Revision | 5.2.3 |
| Lanlink Ring Flag | |
| Lanlink Node ID | |
| Lanlink Ring ID | |
| Modification Date | |
| Update Date | 1/30/2003 9:05:06 AM |
| TID Override | |

Fig. 10

METHOD FOR WEB-BASED EXPLORATION OF NETWORK INFRASTRUCTURE

CROSS-REFERENCE TO RELATED APPLICATIONS

This application is a continuation of U.S. patent application Ser. No. 10/440,892 filed on May 19, 2003 now abandoned, the entire disclosure of which is incorporated herein by reference.

BACKGROUND OF THE INVENTION

1. Field of the Invention

This invention relates to data management. Specifically, the present invention relates to data storage and recovery.

2. Description of the Prior Art

Network service providers operate communication networks. The communication networks include a variety of components. The components may include communication devices, cable components, building infrastructure, etc. Information detailing the components has to be accessible for the service provider personnel to operate the network.

Many service providers have developed systems for storing network information. These systems range from pieces of paper that store configuration information on a specific communication device to localized spreadsheets. Network service personnel typically store network information associated with their respective duties. For example, a technician may store information about the part of the network that he/she is responsible for. A network control center may store information about network performance or trouble tickets. A customer service provider may store information on the customers associated with a specific communication link (i.e., facility).

However, the network information is often localized and inaccessible to the general service provider population. Therefore, the technician may not be able to get access to information on customers associated with the portion of the network that he/she is not responsible for. In addition, the network information is typically stored at a high level of detail; therefore, there is no mechanism to access detailed data on components, etc. Lastly, there is often no mechanism for coordinating the data.

Thus, there is a need for a method of making data available to a wide variety of service provider personnel. There is a need for a method of making detailed data widely available. Lastly, there is a need for a method of coordinating the detailed data.

SUMMARY OF THE INVENTION

A method is presented for providing access to detailed network information. In one embodiment of the present invention, a series of graphical user interfaces (GUIs) are presented to an end user. Operating the GUIs enables the end user to perform data drilling by accessing data at various levels of detail.

In accordance with the teachings of the present invention, operating a first GUI enables an end user to generate a query and send the query to a server. The server responds to the query with items of data. The items of data are used to generate a second GUI in a series of GUIs and are displayed for an end user. Web technology, such as Extensible Markup Language (XML), HyperText Markup Language (HTML), etc., is used to generate the second GUI. The items of data are presented in the second GUI as selectable items of data. As such, when an end user selects one of the items of data, a second query is generated. The second query is processed by the server and the server responds with more-detailed items of data. The more-detailed items of data provide more details on the selected items of data. In addition, the more-detailed items of data are presented as selectable items of data in a third GUI. Operating the series of GUIs (i.e., first GUI, second GUI, third GUI) in this manner enables an end user to perform data drilling.

A method of processing information comprises the steps of receiving network data including a network object in response to generating a first query, the network data representing a network, the network object representing a device in the network; displaying the network data including the network object; generating a device query in response to receiving an input identifying the network object; and receiving device data including a detailed data object in response to generating the device query.

A method of processing information comprises the steps of searching a network data layer in response to an initial query; transmitting network data in response to searching the network data layer, the network data representing a network; receiving a component query in response to transmitting the network data; searching a component data layer in response to the component query; and transmitting component data in response to searching the component data layer, the component data representing a component in the network.

A method of processing information comprises the steps of operating a computer by receiving a network query, a device query and a detailed query in the computer; performing a search using the computer in response to receiving the network query, the device query and the detailed query; and retrieving network data, device data and detailed data using the computer in response to performing the search, wherein the device data provides details on the network data and the detailed data provided details on the device data.

BRIEF DESCRIPTION OF THE DRAWINGS

FIG. 9 is an embodiment of a facility display implemented in accordance with the teachings of the present invention.

FIG. 10 is an embodiment of a device display implemented in accordance with the teachings of the present invention.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In one embodiment of the present invention, a series of graphical user interfaces (GUIs) are presented to an end user on a client machine. Operating the GUIs generates queries that are directed across the network to a server. Methods operating on the server receive the queries, process the queries by searching various databases, and then communicate a response back to the client machine.

The GUIs are dynamically structured using web-based technology. The GUIs are formulated and presented to the end user based on the data available in the databases. For example, a first GUI is presented. Operating the first GUI generates queries that cause the server to operate and respond with information that is used to generate a second GUI. Operating the second GUI generates queries that cause the server to operate and respond with information that is used to generate a third GUI.

In one embodiment of the present invention, operating the GUIs includes generating queries by identifying data objects. A data object is an item of data, such as a component identification number or a serial number, which has been presented in a GUI as a selectable item. For example, when XML or HTML is used, a component identification number may be presented in a web browser as a selectable item (i.e., data object). As such, when an end user selects the item (i.e., the component identification number), more details on the component are provided to the end user.

In addition, operating each GUI generates queries to different data layers in a layered network database. For example, the first GUI generates a query that accesses a first data layer of information, the second GUI generates a query that accesses a second data layer of information, the third GUI generates a query that accesses a third data layer of information, etc. In one embodiment of the present invention, each data layer provides more-detailed information on the data stored in the previous data layer. For example, the second data layer includes details on information stored in the first data layer.

Figure 1:
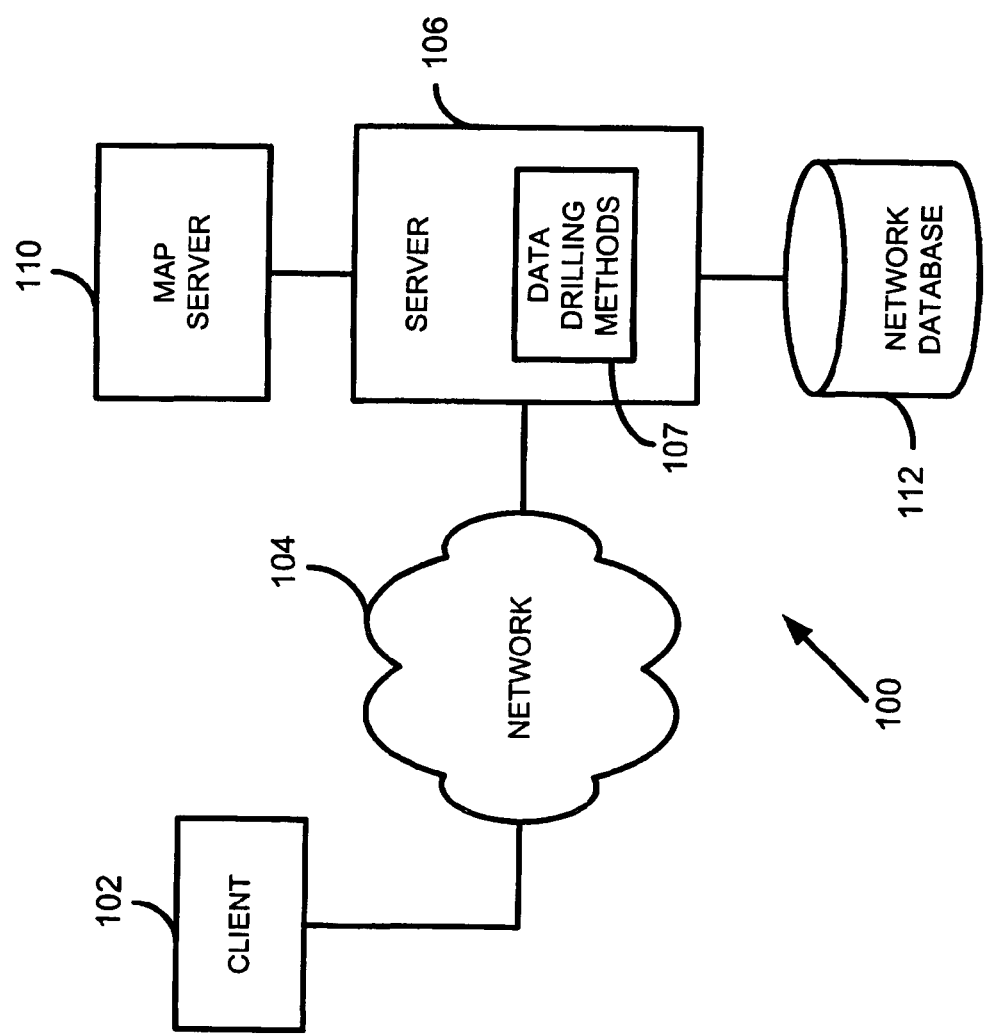
FIG. 1 displays a network architecture implementing the teachings of the present invention.

FIG. 1 displays a network architecture 100 implemented in accordance with the teachings of the present invention. In FIG. 1, a client 102 communicates across a network 104 to access a server 106. The server 106 is in communication with a map server 110 and a network database 112. In addition, data drilling methods 107 are implemented on the server 106.

During operation, an end user operates the client 102 and inputs information or selects information presented in a GUI. Operating the client 102 generates a query. The query is communicated across the network 104 to the server 106. Server 106 receives the query and processes the query. Server 106 operates the data drilling methods 107 which access data. Map information is accessed from the map server 110 in response to the query and/or network information is accessed from the network database 112. Both the map information and the network information are communicated back to the server 106 across the network 104 to the client 102, where the map information and the network information are displayed using the client 102.

The client 102 may be implemented with hardware, software, or a combination of hardware and software. In one embodiment, the client 102 is used to generate a graphical user interface, such as a web browser or a windowing system. The client 102 may operate using web technology, such as Extensible Markup Language (XML), HyperText Markup Language (HTML), Active X controls, Common Gateway Interface (CGI) scripts, Active Server Pages (ASP), Web Services, etc.

The network 104 may be implemented with a variety of technologies. For example, the network 104 may be implemented with packet-switched technology, circuit-switched technology, wireless technology, etc. In one embodiment of the present invention, the network 104 represents the Internet or the World Wide Web.

The server 106 may be implemented with hardware, software, or a combination of hardware and software. In addition, the server 106 may be implemented with web-based technology, such as XML, HTML, Active X controls, CGI scripts, and Web Services. The server 106 operates based on methods, such as data drilling methods 107. The data drilling methods 107 query the map server 110 and the network database 112 for detailed data. For example, in one embodiment of the present invention, data drilling is performed when the server 106 searches and acquires a second data object based on a query generated by selecting a first data object, where the second data object provides more details on the first data object.

The map server 110 is in communication with the server 106. The map server 110 communicates map information. The map information is used by the client 102 to display an image of a map. The map information is implemented in layers. For example, a first layer may represent a country, a second layer may represent a state, and a third layer may represent a city. In one embodiment of the present invention, the map server 110 may be a web server accessible through a URL that provides map information, such as a weather URL or a map URL, etc. In an alternative embodiment, the map server 110 is implemented with technology such as Autodesk Mapguide, a registered trademark of Autodesk Incorporated.

The network database 112 stores network information. The network information includes various levels of information associated with the network 104. For example, high-level network information, such as information on circuits, bridges, and routers, and low-level network information (i.e., detailed network information), such as information on specific boards within a device, may be stored in the network database 112. Data drilling methods 107 operate in the server 106 and drill for data by accessing high-level network information and then using the high-level network information to access low-level network information. To perform the data drilling, the high-level network information is associated with the low-level network information by using a key. It should be appreciated that in addition to high-level network information and low-level network information, various intermediate levels of network information are implemented. In one embodiment of the present invention, the network information is updated on a periodic basis. In another embodiment of the present invention, the network information is updated in real time. For example, as components in the network 104 change, the data drilling methods 107 running on the server 106 receive the changed information (i.e., new component information, configuration information, etc.)

from the network 104 and update the network database 112. As such, real-time network information is available in the network database 112.

In another embodiment of the present invention, data layers are implemented in the network database 112. The data layers include information that provides more details on a specific data object. Using the data drilling methods 107 of the present invention, a data object may be identified or a criterion may be defined and more-detailed data may be acquired about the data object or the criterion. Accessing additional details about a data object or criterion is referred to as data drilling in the present invention.

Data drilling is accomplished in the present invention by using a variety of techniques. For example, selected data drilling methods 107 include: (1) a coordinated interaction between software on a client 102 and software on a server 106 is used to perform data drilling; (2) formulating queries that access data related to a data object or criteria at a greater level of detail is another method of performing data drilling; and (3) correlating and defining relationships between the data in network database 112 is another method of accomplishing data drilling. It should be appreciated that while the foregoing data drilling methods have been defined and detailed, any method of identifying first data and acquiring second data associated with the first data, where the second data provides more details on the first data, is considered data drilling and is within the scope of the present invention.

Figure 2:
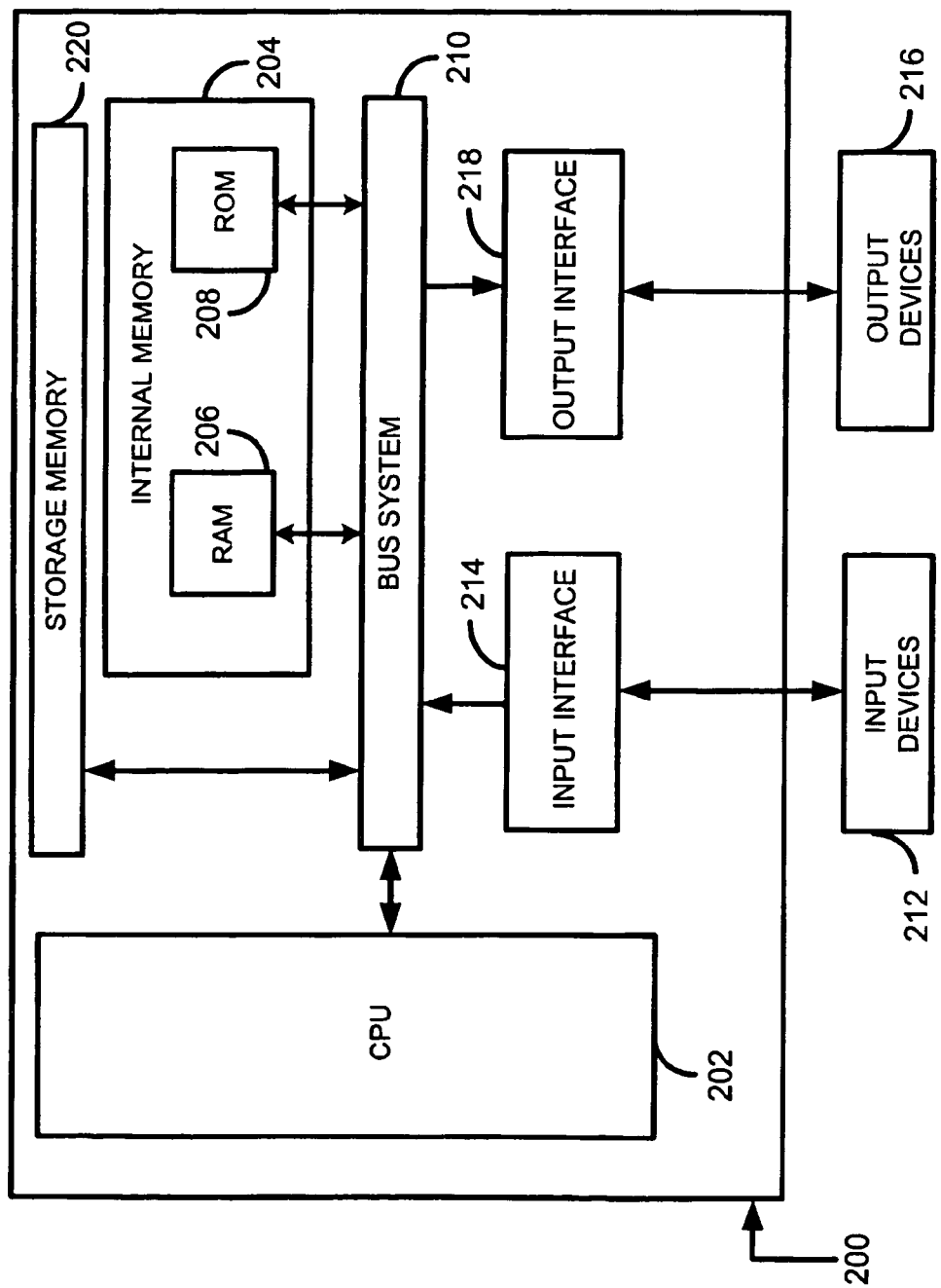
FIG. 2 displays a block diagram of a computer implemented in accordance with the teachings of the present invention.

FIG. 2 displays a block diagram of a computer 200 implemented in accordance with the teachings of the present invention. Client 102, server 106, map server 110, and network database 112 may be implemented with computer 200. A central processing unit (CPU) 202 performs central processing in the computer 200. Internal memory 204 is shown. The internal memory 204 includes short-term memory 206 and long-term memory 208. The short-term memory 206 may be Random Access Memory (RAM) or a memory cache used for staging information. The long-term memory 208 may be a Read Only Memory (ROM) or an alternative form of memory used for storing information. In one embodiment of the present invention, a short-term memory, such as RAM 206, may be a display memory and used for storing a GUI for display on a monitor. A storage memory 220, such as a hard drive, is also shown. In one embodiment of the present invention, the network database 112 of FIG. 1 may be stored in a memory, such as storage memory 220. A bus system 210 is used to communicate information between short-term memory 206, long-term memory 208, storage memory 220, input interface 214, output interface 218, and CPU 202.

Input devices, such as a joystick, a keyboard, a microphone, a communication connection, or a mouse, are shown as 212. The input devices 212 interface with the system through an input interface 214. Output devices, such as a monitor, speakers, communication connections, etc., are shown as 216. The output devices 216 communicate with the computer 200 through an output interface 218.

Figure 3:
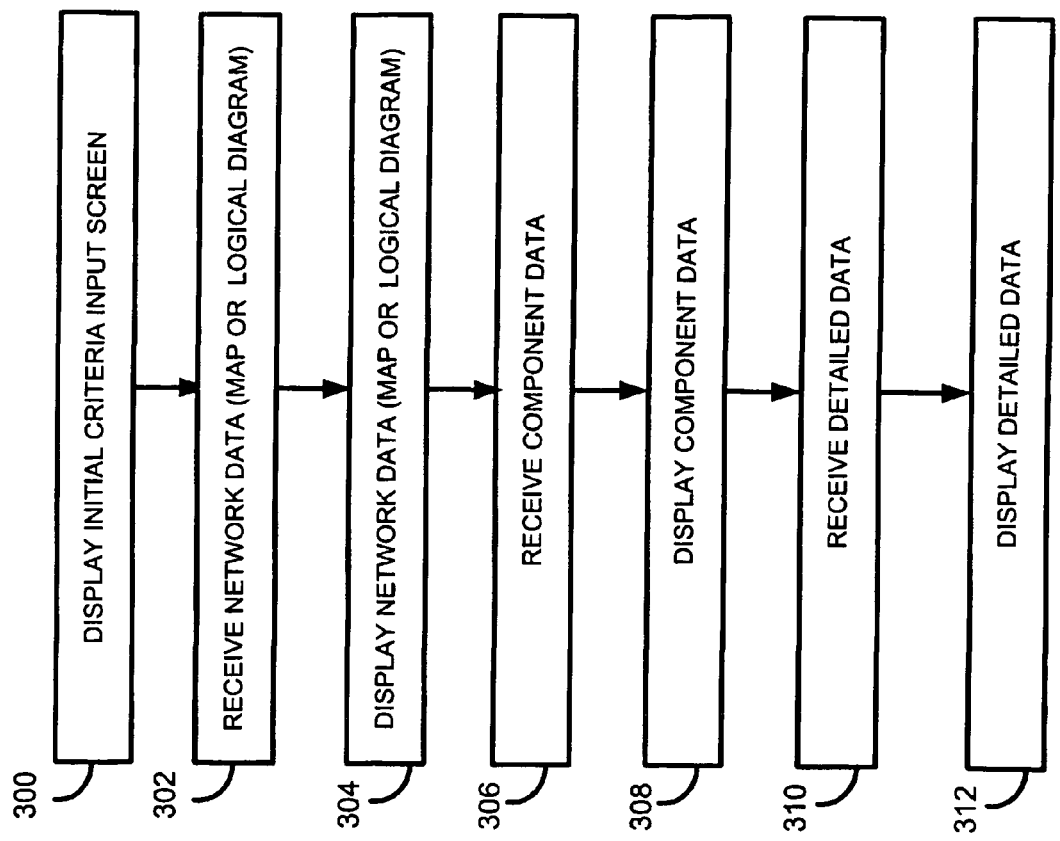
FIG. 3 displays a flowchart depicting a client method implemented in accordance with the teachings of the present invention.

FIG. 3 displays a method of operating a client in accordance with the teachings of the present invention. FIG. 3 will be discussed in conjunction with FIG. 1. In FIG. 3, an initial criteria input screen is displayed on client 102 as stated at 300. Operating the initial criteria input screen generates a query to server 106. In one embodiment of the present invention, the initial criteria input screen is presented in a GUI. An end user operates the GUI (i.e., initial criteria input screen) by selecting items in a pull-down list, inputting information, etc. Operating the GUI generates a query from the client 102 to the server 106. The server 106 performs the query and returns network data to the client 102. The client 102 receives the network data as stated at 302. The network data is then displayed as stated at 304. In one embodiment of the present invention, the network data is displayed as a geographical map. In another embodiment of the present invention, the network data is displayed as a logical diagram. In both embodiments, data objects are displayed in the network data.

The geographical map may be implemented as a layered map and includes data objects that represent states, buildings, facilities (i.e., cables), etc. In one embodiment of the present invention, the geographical map is displayed in a GUI. Operating the GUI includes selecting a data object, which generates a query to acquire more-detailed data on the selected data object.

The logical diagram includes logical data objects that define the logical relationship of a communication network. In one embodiment of the present invention, the logical data objects may include communication devices, facilities (i.e., cables), end users, etc. Selecting a logical data object generates a query to acquire more details about the selected logical data object.

The network data (i.e., geographical map or logical diagram) is presented in a GUI to an end user using client 102. The end user may select an item (i.e., network data object) from the network data. In one embodiment of the present invention, the network data objects represent components of the system. A query is generated in response to selecting a network data object. The server 106 receives the query and responds with component data. The client 102 receives the component data as stated at 306. The component data is displayed as stated at 308. The component data may be displayed as component data objects, such as a building, a device, etc. Selecting a component data object generates a query to acquire more details on the building, device, etc. The server 106 performs the query and responds to the query with detailed data. The client 102 receives the detailed data as stated at 310. The detailed data is then displayed in client 102 as stated at 312. In one embodiment of the present invention, the detailed data is displayed as a data object when there is additional data. When there is no additional data, the detailed data may be displayed as non-selectable item (i.e., text, graphics, etc.).

Figure 4:
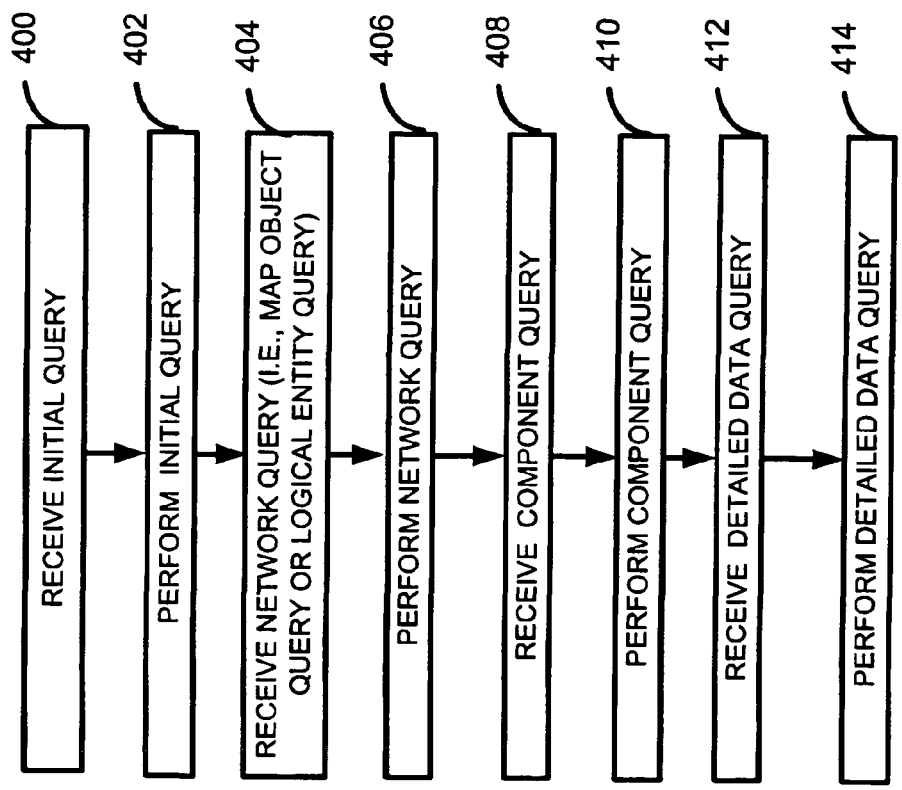
FIG. 4 displays a flowchart depicting a server method implemented in accordance with the teachings of the present invention.

FIG. 4 displays a server method implemented in accordance with the teachings of the present invention. FIG. 4 will be discussed in conjunction with FIG. 1. A server, such as server 106, receives a series of queries. Server 106 performs data drilling methods 107 in response to the queries. Each query causes the server 106 to search and acquire more details on data retrieved by the previous query.

The server 106 receives an initial query as stated at 400. Server 106 performs the initial query as stated at 402. Performing the initial query includes accessing map information from the map server 110 and/or network information from the network database 112. The map information and/or the network information form the information that is communicated back to a client, such as client 102.

An end user operates a GUI on client 102 and generates a network query. The server 106 receives the network query as stated at 404. In one embodiment of the present invention, the network query includes a key with information identifying an object or information identifying an entity. The server 106 performs the network query as stated at 406. Component data is generated by performing the network query. The component data is communicated back to the client 102 and the client 102 displays the component data to an end user. The end user then selects a component data object. Selecting a component data object generates a component data query. Server 106 receives the component data query as stated at 408.

Server 106 then performs the component data query as stated at 410. As a result, detailed data is then communicated back to client 102 for display. The end user then selects a detailed data object. Selecting a detailed data object generates a detailed data query. Server 106 receives the detailed data query as stated at 412. Server 106 then performs the detailed data query as stated at 414. As a result, detailed data is then communicated back to client 102 for display. In one embodiment of the present invention, the network data represents a communications network, the component data represents devices in the communication network and the detailed data represents information (i.e., configuration information, identification information, customer information, etc.) on the devices.

Figure 5:
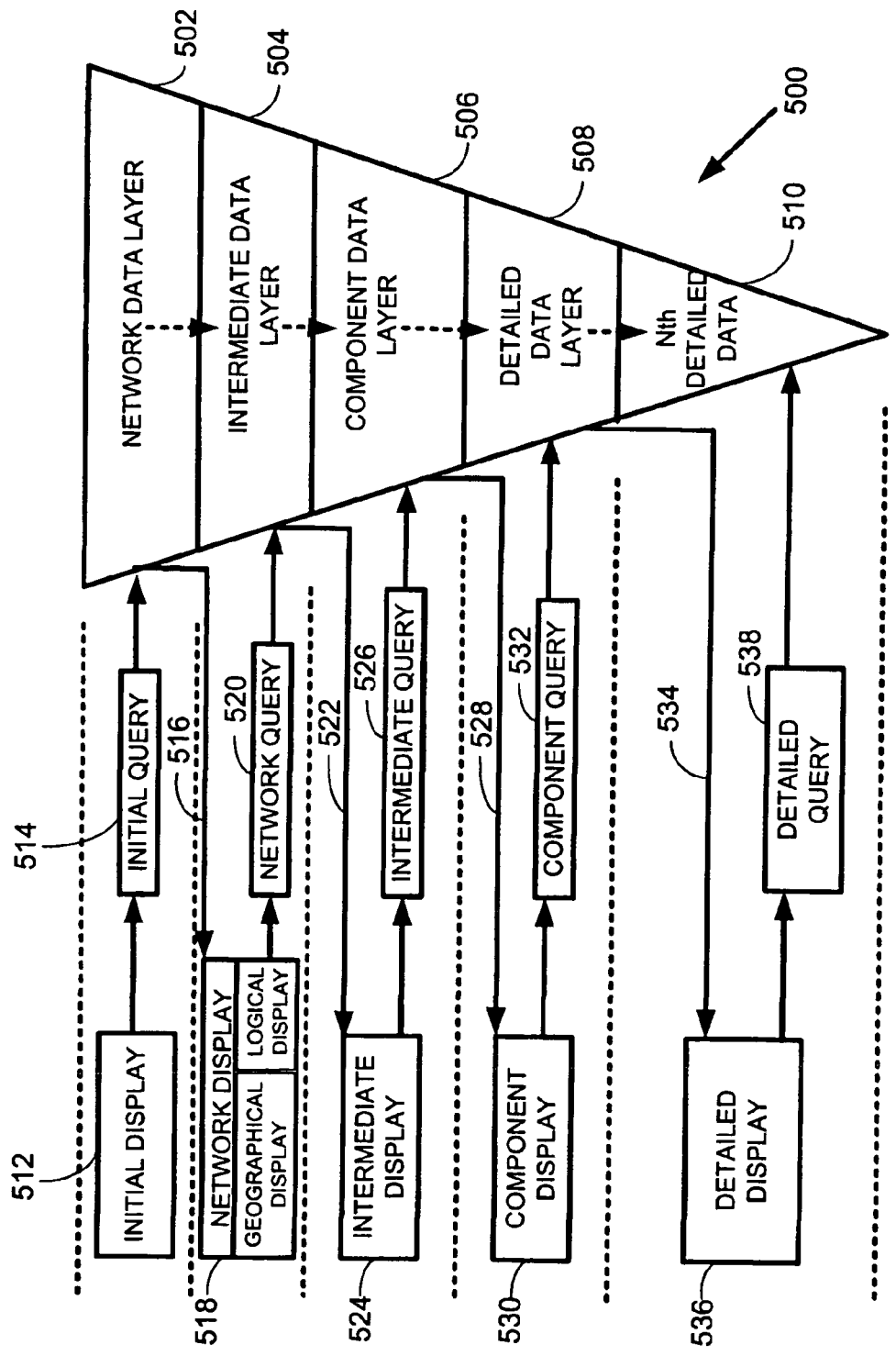
FIG. 5 displays a data flow model implemented in accordance with the teachings of the present invention.

FIG. 5 displays a data flow model implemented in accordance with the teachings of the present invention. FIG. 5 will be discussed in conjunction with FIG. 1. In one embodiment of the present invention, the data flow model of FIG. 5 is used to perform data drilling.

In FIG. 5, a layered data architecture 500 is implemented. The layered data architecture 500 may be implemented in the map server 110, in the network database 112, or in the map server 110 in combination with the network database 112. In one embodiment of the present invention, a series of display layers (i.e., GUIs) are presented to an end user using a client, such as client 102. The display layers are generated using web-based technology, such as HTML, Active X controls, ASP, XML, web browsers, Web Services, etc. The display layers may be presented in a GUI, such as a web browser. Operating the GUI (i.e., display layers) causes the client 102 to generate a query that is communicated across the network 104 to the server 106. The server 106 then performs data drilling methods 107 to acquire data from the map server 110 and the network database 112. The results of the query (i.e., responses) are then communicated from the server 106 back across the network 104 to the client 102. The response is then used by the client 102 to generate a second display layer (i.e., GUI). Therefore, a recursive process is implemented. In the recursive process, a first query is generated by operating a first GUI and the response from the first query is then used to display a second GUI. Operating the second GUI generates a second query and the response to the second query is used to generate a third GUI. In addition, as each GUI and query are generated, data drilling occurs by accessing more-detailed data from the map server 110 and the network database 112.

In one embodiment of the present invention, an initial display (i.e., GUI) is presented in client 102 as shown at 512. Operating the initial display 512 results in an initial query 514. The initial query 514 is communicated across the network 104 to the server 106. The server 106 operates data drilling methods 107. The initial query 514 serves as input to the data drilling methods 107. The data drilling methods 107 then access a network data layer 502. The network data layer 502 may include map information from the map server 110, network information from the network database 112, or a combination of the two. The server 106 communicates a response, such as network data 516, to the initial query 514. The network data 516 is received in the client 102 and is used to generate a network display 518. In one embodiment of the present invention, the network display 518 may be implemented as a geographical display. In another embodiment, the network display 518 may be implemented as a logical display. For example, the network display 518 may be implemented with a geographical image of a communication network displayed in a GUI or a logical image of a communication network displayed in a GUI.

Operating the network display 518 generates a network query 520. The network query 520 is used to access an intermediate data layer 504. The intermediate data layer 504 may be any number of intermediate layers of information. The intermediate data layer 504 is associated with the network data layer 502. For example, the intermediate data layer 504 may provide more details on the network data 516 included in the network data layer 502. Intermediate data 522 is communicated back to the client 102 and used to generate an intermediate display 524 (i.e., intermediate data objects).

Operating the intermediate display 524 generates an intermediate query 526. The intermediate query 526 is used by the server 106 to query a component data layer 506. A component display 530 is generated using component data 528 (i.e., such as device data representing a device in a network). Operating the component display 530 results in a component query 532. The component query 532 accesses a detailed data layer 508. Detailed data 534 is communicated and used to display a detailed display 536 on client 102. Operating the detailed display 536 generates a detailed query 538 that accesses nth detailed data 510 (i.e., such as detailed data on a device in a network), where nth detailed data 510 represents any number of layers of detailed data.

Figure 6:
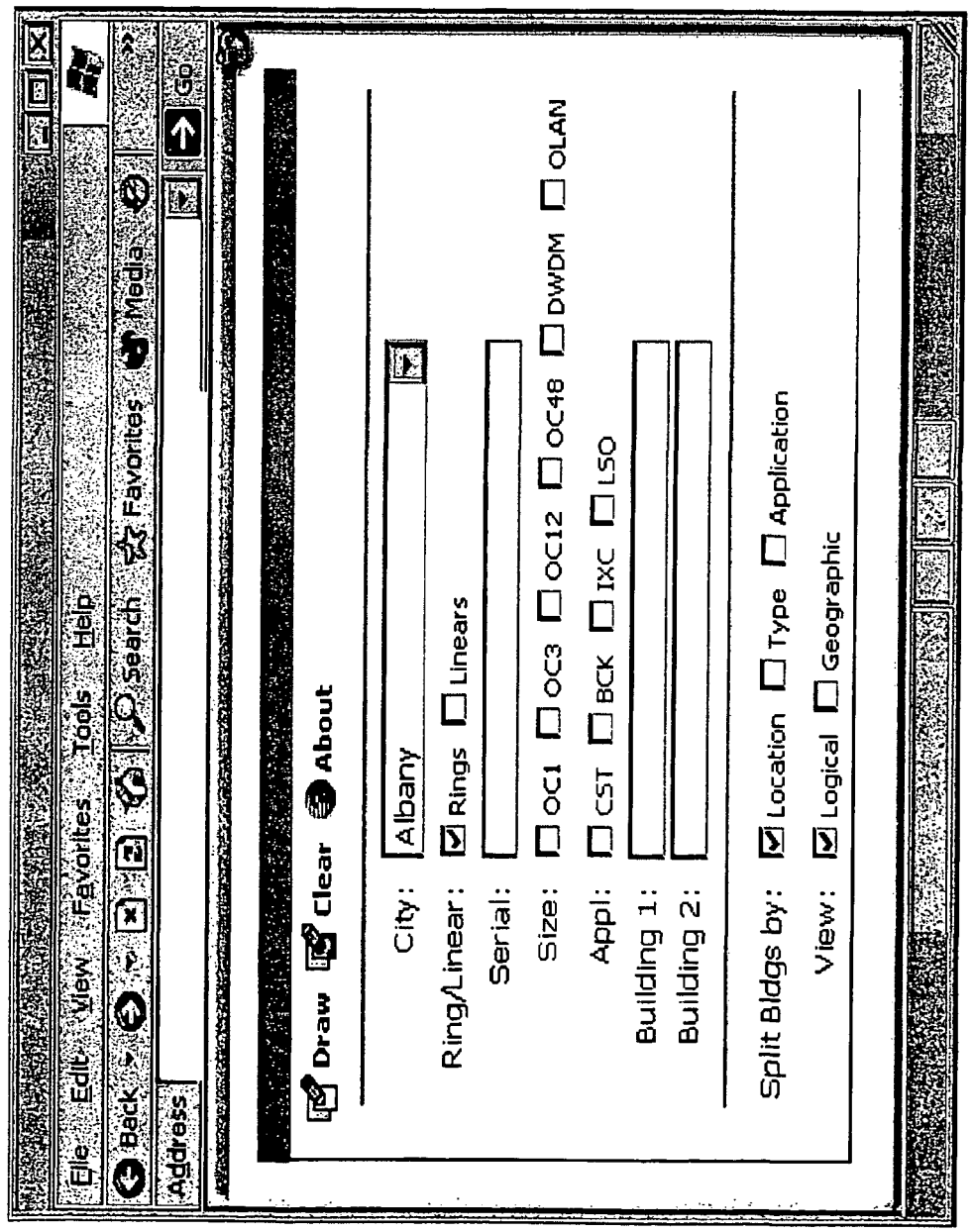
FIG. 6 displays an initial graphical user interface implemented in accordance with the teachings of the present invention.

FIG. 6 displays an initial criteria input screen (i.e., GUI) implemented in accordance with the teachings of the present invention. FIG. 6 will be discussed in conjunction with FIG. 5. FIG. 6 displays one implementation of the initial display 512. Operating the initial display 512 generates the initial query 514.

In one embodiment of the present invention, the initial display 512 is implemented with selectable items (i.e., pop-up list, pull-down list, etc.) and input fields. For example, several fields are defined, such as a City field, Ring/Linear field, a Serial field, a Size field, an application (Appl) field, Building fields, a Split Buildings (Bldgs) By field, and a View field. Selecting or inputting an item in a field formulates a query. For example, when a city is identified in the City field, the initial query 514 is defined based on the city. Therefore, a server 106 receiving the query will perform a search using the city as a key for the search.

Using the GUI displayed in FIG. 6, selecting a city from the pull-down list defines the city that is part of the query (i.e., will be used in the search). The Ring/Linear field defines whether a query should be generated for a ring facility or a linear facility, where a facility is the infrastructure transmission medium (i.e., physical or logical connection between two end points). The Serial field identifies the serial number of the facility or device that is being queried. The Size field identifies the size of a facility. For example, in one embodiment of the present invention, the size of a facility is characterized by the Optical Carrier (OC) speed (OC1, OC3, OC12, OC48), the Dense Wave Division Multiplexer (DWDM), etc. The application (Appl) field defines the application that the facility carries. For example, a CST is a customer facility, a BCK is a backbone facility, an IXC is an inter-exchange carrier facility, etc. The Building fields define the buildings the facility or device is associated with. For example, the building that the facility runs through may be identified using the Building fields. The Split Bldgs By field enables the end user to split buildings by location, type, or application. Splitting building by location causes the logical view to display buildings divided into nodes that represent different locations. Splitting building by type causes the logical view to display a building divided into nodes that serve as terminals for facilities of a specific type. Splitting building by application causes the logical view to display building divided into nodes that serve as terminals for facilities of a specific application. The View field is used to define whether a logical display (i.e., logical view), a geographical display (i.e., map view), or both are generated on client 102.

Figure 7:
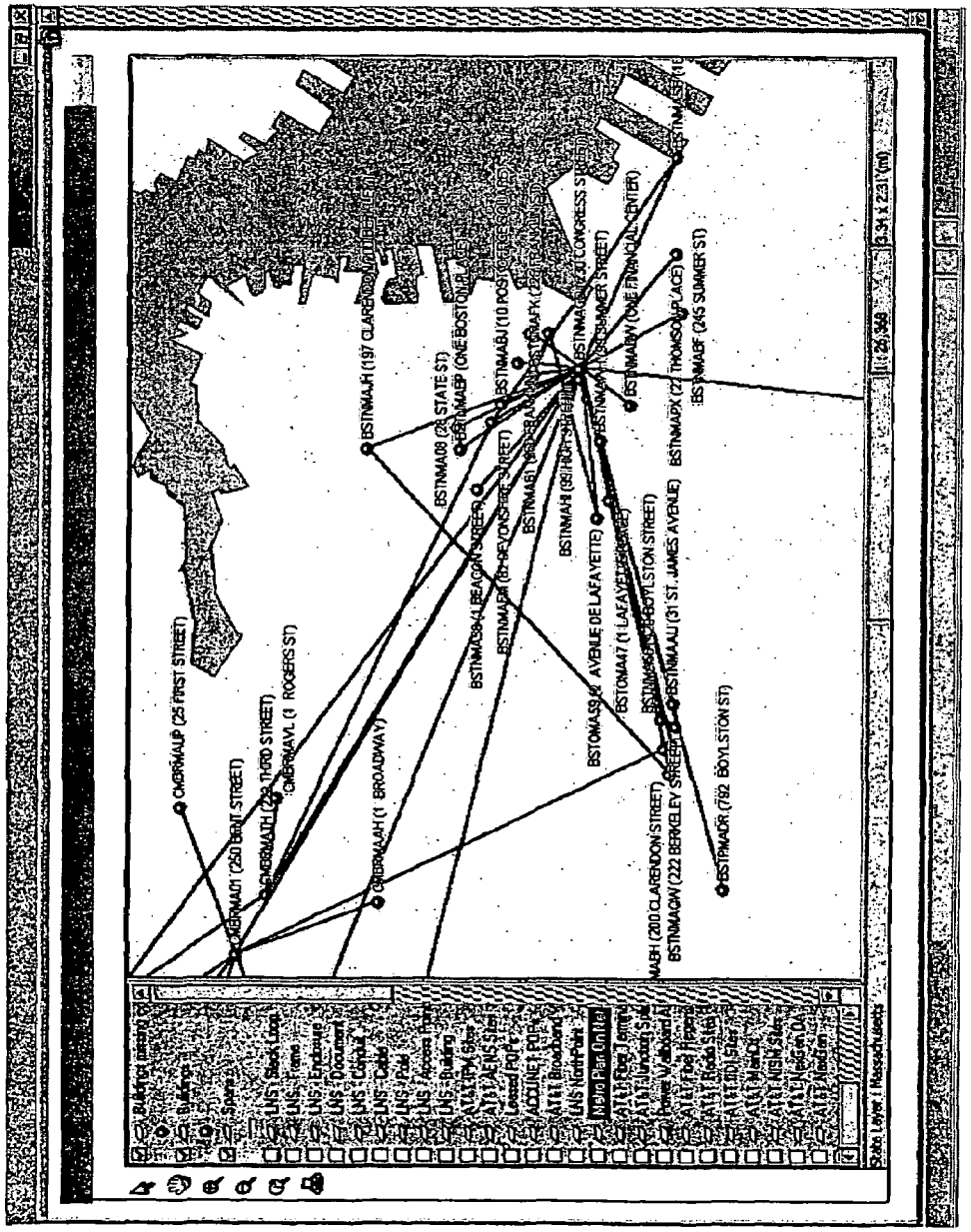
FIG. 7 is an embodiment of a geographical display implemented in accordance with the teachings of the present invention.

A geographical display implemented in accordance with the teachings of the present invention is shown in FIG. 7. FIG. 7 is one embodiment of the geographical display option of the network display 518 of FIG. 5. Operating FIG. 7 by selecting a data object (i.e., cable link, a location, etc.) will result in a network query 520 of FIG. 5.

Figure 8:
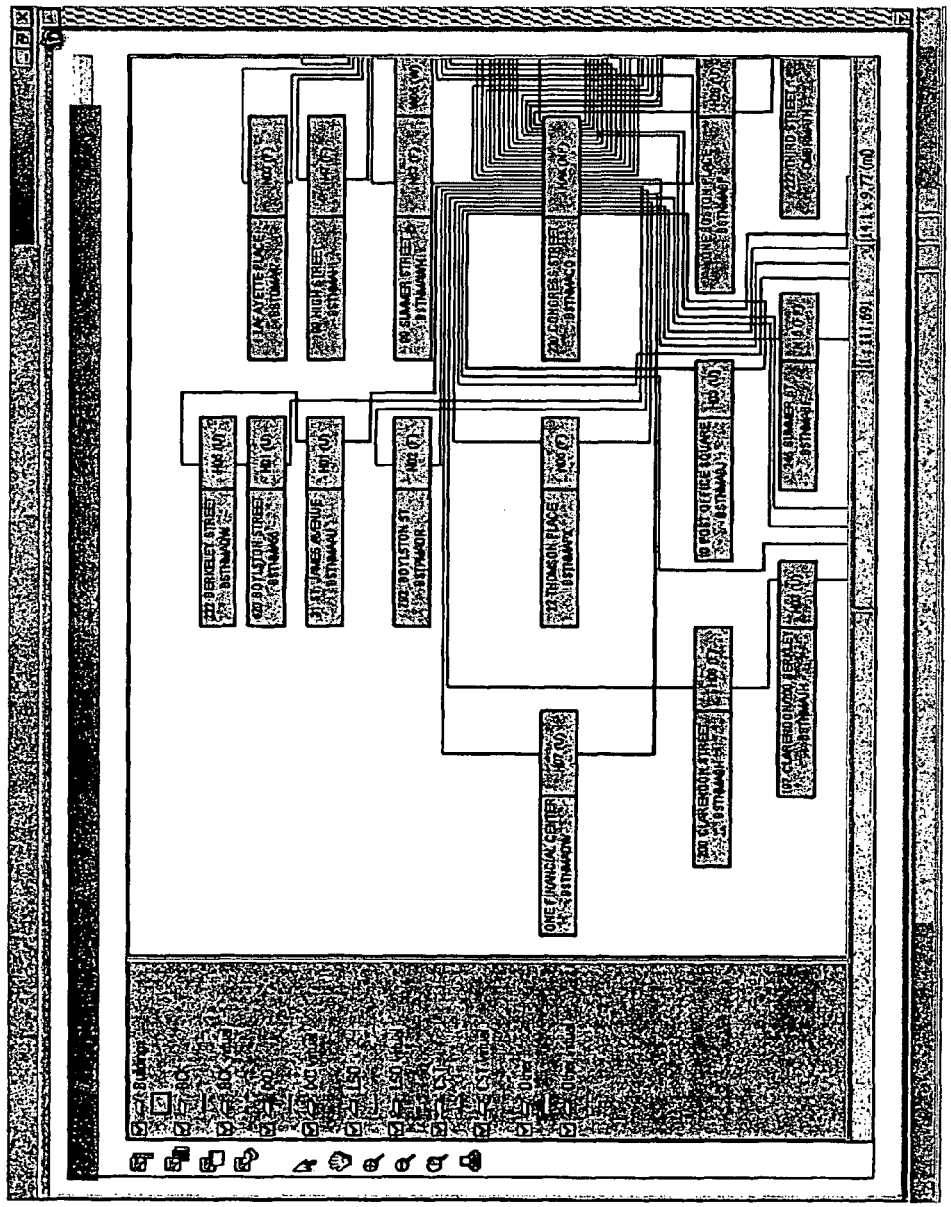
FIG. 8 is an embodiment of a logical display implemented in accordance with the teachings of the present invention.

FIG. 8 is one embodiment of a logical display of the network display 518 of FIG. 5. Operating the logical display of FIG. 8 by selecting a logical data object (i.e., a link, logical entity, etc.) results in a network query 520 of FIG. 5. For example, by operating the logical display shown in FIG. 8, a network query 520 may be launched. Specific queries, such as Facility Data, Carries Facility, Facility Carries, Customer Circuits, Ring View, Span Information, and Project Data, may be defined. The Facility Data query includes data on a specific facility. The Facility Carries query includes a list of facilities carried by a selected facility. The Carries Facility query includes a list of facilities that carry a selected facility. The Customer Circuits query includes a list of customer circuits that operate using (i.e., ride) a selected facility. The Ring View query includes ring layout that is a visual representation of spans in the ring and slots in the spans. The Span Information query includes a list of facilities included in a span. The Project Data query includes data on a project associated with a selected facility.

FIG. 9 is an embodiment of a facility display implemented in accordance with the teachings of the present invention. FIG. 9 is one embodiment of a detailed display 536 which includes detailed data 534 of FIG. 5. Operating FIG. 9 will generate a detailed query 538 of FIG. 5. In one embodiment of the present invention, FIG. 9 is a detailed display 536 of data associated with a facility. Specific data, such as Serial, Type, Channel, Circuit ID, Circuit Type, Location A, Start Building, Start Device, Start Device Type, Start Port, Location Z, End Building, End Device, End Device Type, End Port, Status, Customer Facility, Format, Customer ID, Project ID, Roll Project ID, Bandwidth, Condition, Type Flag, Remarks, Local Exchange Carrier (LEC) ID, LEC Order Number, LEC Name, Original Status, Original Project ID, Engineered Date, Turn Up Date, Due Date, Turn Down Date, Roll Turn Up Date, Fan Out ID, Special Flags, Engineer Name, Primary Flag, Virtual Local Area Network (VLAN) ID, Create Log Name, Creation Date, Modify Log Name, Modification Date, Engineer Department ID, Start City, End City, and Owner City, may be displayed.

FIG. 10 is an embodiment of a device display implemented in accordance with the teachings of the present invention. FIG. 10 is another embodiment of a detailed display 536 that includes detailed data 534 of FIG. 5. Operating FIG. 10 will generate a detailed query 538 of FIG. 5. In one embodiment of the present invention, FIG. 10 is a detailed display 536 of data associated with a device. Data associated with a device may include Location, Device ID, Bayrack ID, Device Type, Part Number, Part Revision, Project Number, Inventory Number, Status, Remarks, Install Date, Purchase Date, Network Address, Power Source, Backup Power Source, Equipment Cost, Labor Cost, Cost, Craft Interface, Ownership, Kit, Software Revision, Lanlink Ring Flag, Lanlink Node ID, Lanlink Ring ID, Modification Date, Update Date, Band ID, Facility Flag, Fiber, Number of Slots, etc.

Figure 11:
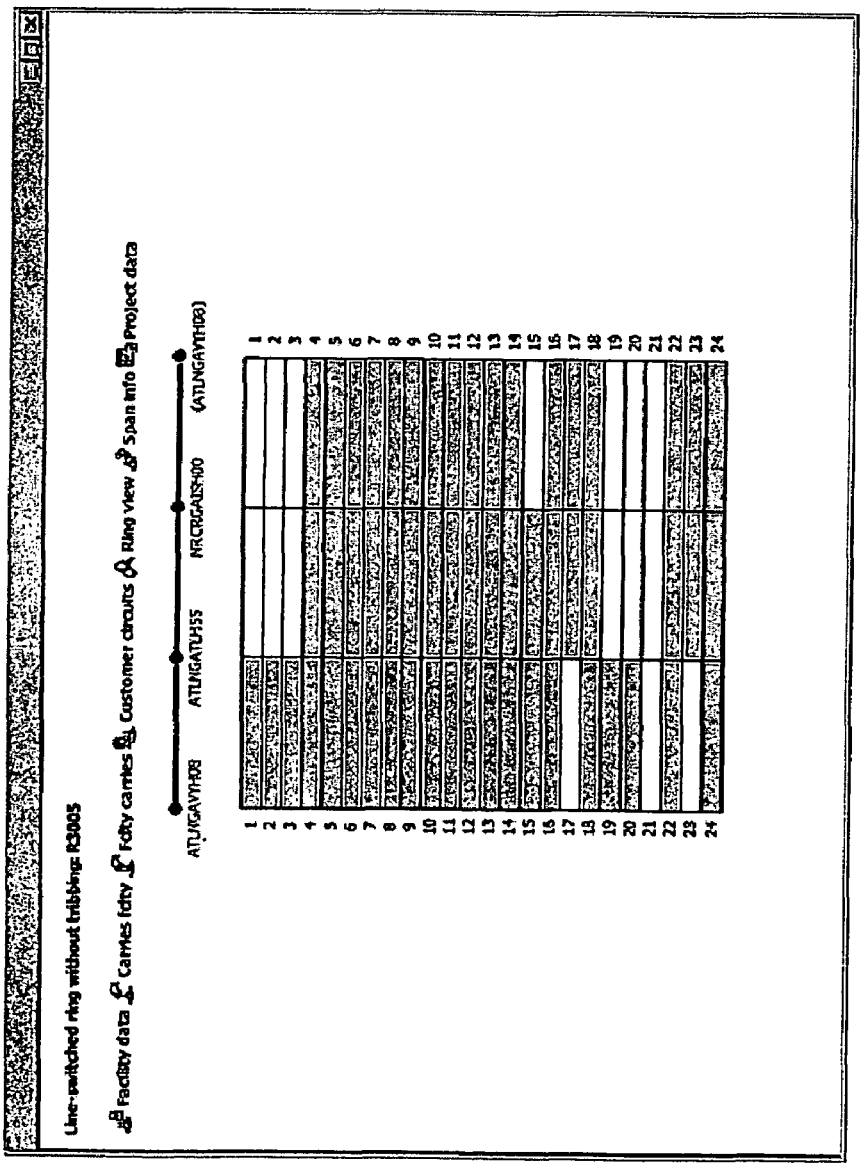
FIG. 11 is an embodiment of a ring display implemented in accordance with the teachings of the present invention.

FIG. 11 includes a ring display implemented in accordance with the teachings of the present invention. When operating the ring display of FIG. 11, an end user may access Facility Data, Carries Facility, Facility Carries, Customer Circuits, Ring View, Span Information, and Project Data. The Facility Data query includes data on a specific facility. The Facility Carries query includes a list of facilities carried by a selected facility. The Carries Facility query includes a list of facilities that carry a selected facility. The Customer Circuits query includes a list of customer circuits that operate using (i.e., ride) a selected facility. The Ring View query includes ring layout, which is a visual representation of spans in the ring and slots in the spans. The Span Information query includes a list of facilities included in a span. The Project Data query includes data on a project associated with a selected facility.

Figure 12:
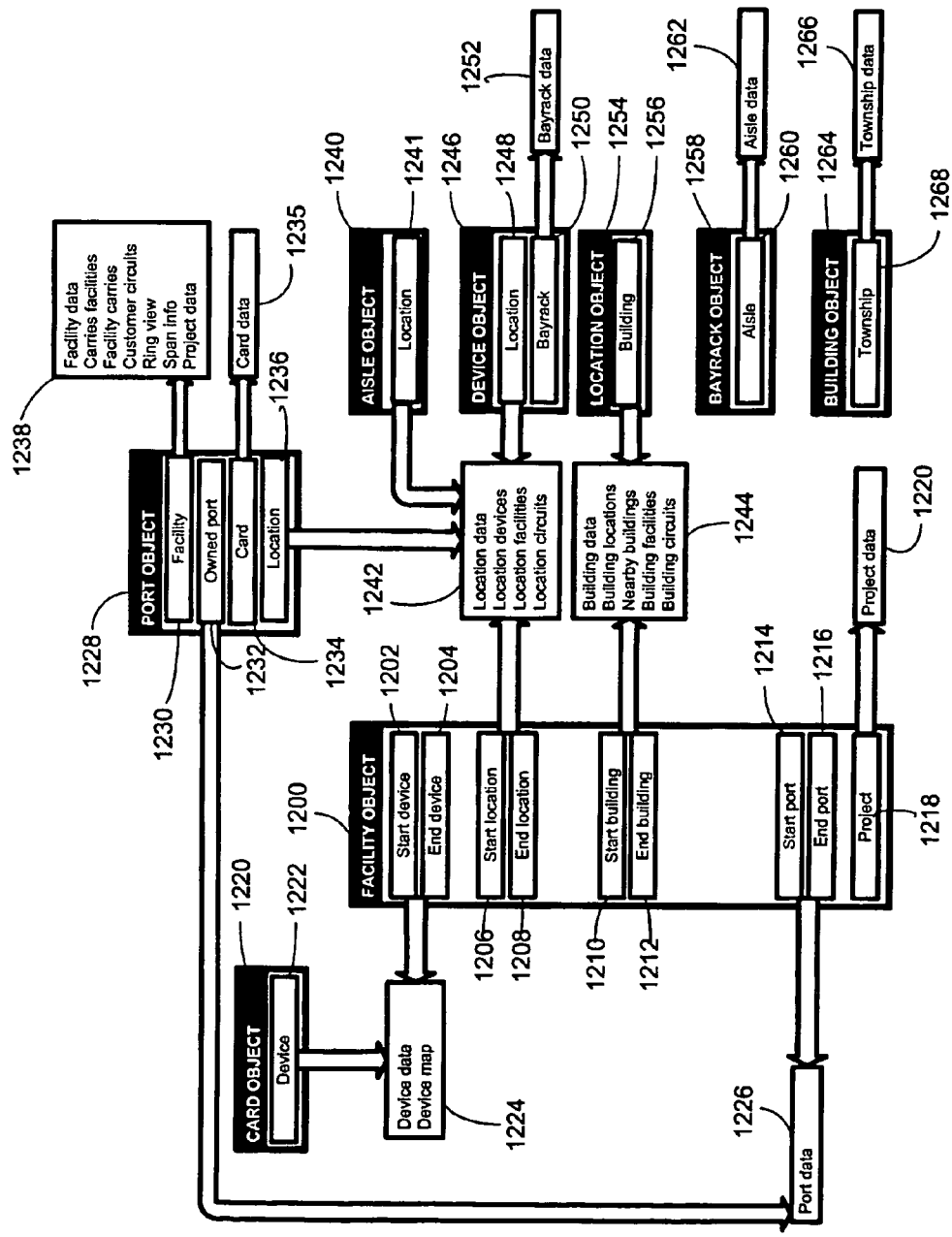
FIG. 12 displays a data-drilling diagram implemented in accordance with the teachings of the present invention.

FIG. 12 displays a data-drilling diagram implemented in accordance with the teachings of the present invention. The data-drilling diagram on FIG. 12 shows data objects, their corresponding data forms (GUIs), and functions associated with every selectable item of object data (i.e., data components). For example, the Facility Object 1200 is defined. The Facility Object 1200 includes: Start device 1202, End device 1204, Start location 1206, End location 1208, Start building 1210, End building 1212, Start port 1214, End port 1216, and Project 1218. The Start device 1202 and End device 1204 include data on the starting and ending devices of a facility. The Start device 1202 and the End device 1204 are linked to Device information 1224, which includes Device data and Device map. The Start location 1206 and the End location 1208 include Location information 1242 on the starting and ending location of a facility. The Location information 1242 includes Location data, Location devices, Location facilities, and Location circuits. The Start building 1210 and the End building 1212 include Building information 1244 on the starting and ending building of a facility. The Building information 1244 includes Building data, Building locations, Nearby buildings, Building facilities, and Building circuits. The Start port 1214 and the End port 1216 include Port data 1226 on the start port and the end port of a facility. The Port data 1226 includes port data. The Project 1218 is linked to Project data 1220.

The Card Object 1220 is defined. The Card Object 1220 includes a Device 1222. The Device 1222 is linked to Device information 1224, such as Device data and Device map. A Port Object 1228 includes a Facility 1230, an Owned port 1232, a Card 1234, and a Location 1236. The Facility 1230 is linked to Facility information 1238. The Facility information 1238 includes Facility data, Carries facilities, Facility carries, Customer circuits, Ring view, Span information, and Project data. The Card 1234 is linked to Card data 1235.

The Aisle Object 1240 includes a Location 1241. The Location 1241 is linked to Location information 1242. The Device Object 1246 includes a Location 1248 and a Bayrack 1250. The Location 1248 is linked to Location information 1242 and the Bayrack 1250 is linked to Bayrack data 1252. The Location Object 1254 includes a Building 1256. The Building 1256 is linked to Building information 1244. The Bayrack Object 1258 includes an Aisle 1260, which is linked to Aisle data 1262. The Building Object 1264 includes a Township 1268. The Township 1268 includes Township data 1266.

FIG. 12 displays data objects and the relationship (i.e., functions, transitions, etc.) between the data objects. Each data object may be displayed in a GUI. Selecting the data objects results in more-detailed data being displayed in a subsequent GUI. The more-detailed data is also a selectable data object. For example, Facility Object 1200 GUI has the following selectable pieces of data: Start device 1202, End device 1204, Start location 1206, End location 1208, Start building 1210, End building 1212, Start port 1214, End port 1216, and Project 1218. Start device 1202 and End device

1204 have the functions "Device data" and "Device map" shown in 1224 associated with them. The "Device data" function accesses the Device object 1246 (this transition is not shown in FIG. 12). The "Device map" function provides an end user with a GUI that displays the device map (i.e., visual representation of its port layout).

Thus, the present invention has been described herein with reference to a particular embodiment for a particular application. Those having ordinary skill in the art and access to the present teachings will recognize additional modifications, applications, and embodiments within the scope thereof.

It is, therefore, intended by the appended claims to cover any and all such applications, modifications, and embodiments within the scope of the present invention.

What is claimed is:

1. A method of processing information comprising the steps of:
    operating a computer;
    receiving a network query, a device query, and a detailed query in the computer;
    performing at least one search using the computer in response to receiving the network query, the device query, and the detailed query;
    retrieving network data, device data, and detailed data using the computer in response to performing at least one search, wherein the device data provided details on the network data, said network data includes a list of network facilities carried by a facility, and the detailed data provided details on the device data; and
    displaying at least one of: the network data, the device data or the detailed data on an output device of the computer.

2. The method of processing information as set forth in claim 1, wherein the step of operating the computer is performed with Web Services.

3. The method of processing information as set forth in claim 1, wherein the step of operating the computer is performed with Active Server Pages.

4. The method of processing information as set forth in claim 1, wherein the network data includes a list of facilities that carries a facility.

5. The method of processing information as set forth in claim 1, wherein the network data includes a list of customer circuits that rides on a facility.

6. The method of processing information as set forth in claim 1, wherein the network data includes a list of facilities included in a span.

7. The method of processing information as set forth in claim 1, wherein the network data includes a list of facilities associated with a building.

8. The method of processing information as set forth in claim 1, wherein the detailed data includes a bayrack housing a device.

9. The method of processing information as set forth in claim 1, wherein the detailed data represents an aisle for a bayrack.

10. The method of processing information as set forth in claim 1, wherein the network data is represented as a map.

11. The method of processing information as set forth in claim 1, wherein the network data is represented as a logical diagram.

12. A system for processing information comprising:
    a network for receiving a query generated by a client;
    a server for processing said query;
    a network database in communication with the server for generating a network data in response to said query, said network data includes a list of network facilities carried by a facility;
    a map server in communication with the server for generating map data in response to said query; and
    an output device for displaying at least one of: the network data or the map data.

13. The system of claim 12 wherein said server includes data drilling methods to query the map server and the network database for detailed data.

14. The system of claim 12 wherein said network data and said map data are displayed to the client.

15. The system for processing information as set forth in claim 12, wherein the network data includes a list of facilities that carries a facility.

16. The system for processing information as set forth in claim 12, wherein the network data includes a list of customer circuits that rides on a facility.

17. The system for processing information as set forth in claim 12, wherein the network data includes a list of facilities included in a span.

18. The system for processing information as set forth in claim 12, wherein the network data includes a list of facilities associated with a building.

19. The system for processing information as set forth in claim 12, wherein the network data is represented as a map.

20. The system for processing information as set forth in claim 12, wherein the network data is represented as a logical diagram.

* * * * *